(12) United States Patent
van der Meer et al.

(10) Patent No.: US 7,872,571 B2
(45) Date of Patent: Jan. 18, 2011

(54) VEHICLE ALARM DEVICE

(75) Inventors: Arend Michiel van der Meer, Almere (NL); Mattheus Jacobus van der Meer, Drachten (NL)

(73) Assignee: Life Safety Products B.V., LC Capelle aan den Ijssel (NL)

( * ) Notice: Subject to any disclaimer, the term of this patent is extended or adjusted under 35 U.S.C. 154(b) by 0 days.

(21) Appl. No.: 10/545,243

(22) PCT Filed: Feb. 11, 2004

(86) PCT No.: PCT/NL2004/000100

§ 371 (c)(1),
(2), (4) Date: Jan. 3, 2006

(87) PCT Pub. No.: WO2004/071810

PCT Pub. Date: Aug. 26, 2004

(65) Prior Publication Data
US 2006/0187011 A1    Aug. 24, 2006

(30) Foreign Application Priority Data
Nov. 2, 2003 (NL) .................................. 1022646

(51) Int. Cl.
*B60Q 1/26* (2006.01)
(52) U.S. Cl. ............................ 340/468; 340/467; 70/45
(58) Field of Classification Search ................. 340/467, 340/468
See application file for complete search history.

(56) References Cited

U.S. PATENT DOCUMENTS

| | | | | |
|---|---|---|---|---|
| 4,034,338 A | * | 7/1977 | Bevilacqua | 340/464 |
| 4,717,904 A | * | 1/1988 | Murakami | 340/436 |
| 4,959,637 A | * | 9/1990 | Woods et al. | 340/573.1 |
| 4,988,220 A | * | 1/1991 | Christiansen et al. | 384/448 |
| 5,034,847 A | * | 7/1991 | Brain | 362/205 |
| 5,652,565 A | * | 7/1997 | Salcedas et al. | 340/479 |
| 5,663,707 A | * | 9/1997 | Bartilucci | 340/464 |
| 5,764,141 A | * | 6/1998 | Chang | 340/472 |
| 5,825,280 A | * | 10/1998 | Merendini et al. | 340/326 |
| 5,909,173 A | * | 6/1999 | Mason et al. | 340/467 |
| 5,963,130 A | * | 10/1999 | Schlager et al. | 340/540 |
| 6,198,390 B1 | * | 3/2001 | Schlager et al. | 340/540 |
| 6,275,149 B1 | * | 8/2001 | Tung | 340/473 |
| 6,278,364 B1 | * | 8/2001 | Robert | 340/467 |
| 6,336,729 B1 | * | 1/2002 | Pavelle et al. | 362/34 |
| 6,337,550 B1 | * | 1/2002 | Takahashi et al. | 318/483 |
| 6,411,204 B1 | | 6/2002 | Bloomfield et al. | |
| 6,417,767 B1 | * | 7/2002 | Carlson et al. | 340/467 |

(Continued)

FOREIGN PATENT DOCUMENTS

DE    101 14 860 A1    3/2001

(Continued)

*Primary Examiner*—George A Bugg
*Assistant Examiner*—Kerri McNally
(74) *Attorney, Agent, or Firm*—Lucas & Mercanti, LLP

(57) ABSTRACT

The invention relates to a device for placement in a vehicle, comprising a housing, at least one lighting element, an acceleration and/or deceleration circuits and/or a moisture sensor, the device being arranged for operatively switching on the lighting element when the device, in particular the acceleration and/or deceleration circuit, experiences an acceleration or deceleration which exceeds a pre-set maximum value and/or if the device comes at least partly under water.

27 Claims, 4 Drawing Sheets

U.S. PATENT DOCUMENTS

| | | | |
|---|---|---|---|
| 6,714,127 B2 * | 3/2004 | Perez et al. | 340/467 |
| 6,739,733 B1 * | 5/2004 | Lamke et al. | 362/646 |
| 6,753,769 B1 * | 6/2004 | Elliott | 340/464 |
| 6,789,930 B2 * | 9/2004 | Pederson | 362/545 |
| 6,805,467 B2 * | 10/2004 | Wolf | 362/259 |
| 6,870,474 B1 * | 3/2005 | Brothers | 340/468 |
| 6,885,294 B1 * | 4/2005 | Tonkin | 340/463 |
| 2002/0008617 A1 * | 1/2002 | Lee | 340/468 |

FOREIGN PATENT DOCUMENTS

| | | |
|---|---|---|
| FR | 2 707 937 A1 | 7/1993 |
| WO | WO 96/37381 | 11/1996 |

* cited by examiner

VEHICLE ALARM DEVICE

This patent application claims the benefit of priority from Dutch Patent Application No. NL 1022646 filed Feb. 11, 2003 through PCT Application Ser. No. PCT/NL2004/000100 filed Feb. 11, 2004, the contents of each of which are incorporated herein by reference.

The invention relates to a device for placement in a vehicle, more particularly, a device for enhancing safety, especially for passengers and for other vehicles.

Driving vehicles entails risk. Thus, there is a chance that a vehicle will be involved in a collision, for instance with another vehicle or with an obstacle. In this connection, an important source of physical injury and further damage is following traffic, since when a vehicle suddenly brakes or experiences a particularly great deceleration or acceleration as a result of a collision, following traffic may collide with the vehicle in front, so that passengers of the vehicle involved in the collision as well as of the vehicle driving into the back of the vehicle in front may get injured. Moreover, the vehicle driving into the backs of a vehicle in font will be damaged.

A further hazard of the use of a vehicle such as an automobile is that, for instance after a collision, it may get into the water and the passengers cannot leave the vehicle fast enough, at least not on their own. Such a vehicle having got into the water is often difficult to find for rescue workers.

The object of the invention is to provide a device with which at least a number of the above-mentioned hazards can be mitigated. To that end, a device according to the invention is characterized by the features according to claim 1.

A device according to the invention is arranged such that if a vehicle that is equipped with it has an accident, at least, must brake particularly hard or otherwise experiences a sudden acceleration or deceleration indicative of an accident, at least one lighting element is switched on. With it, other traffic is warned of the occurring acceleration and/or deceleration. Moreover, such a device may be equipped with a moisture sensor, such that, if the vehicle gets into the water, the at least one lighting element is switched on and the vehicle is traceable for bystanders, also under water and even in the dark. If both an acceleration and/or deceleration circuit and a moisture sensor are present in the device, an additional advantage is achieved in that a double protection is provided for the situation where the vehicle might get into the water, since the vehicle getting into the water will typically also entail an unnaturally high acceleration and/or, in particular, deceleration of the vehicle.

As, for instance upon a collision, the at least one lighting element is switched on, a following vehicle will be warned particularly fast of occurring decelerations, so that its driver can react sooner and thus perhaps avoid a collision or at least reduce the impact thereof.

It is preferred that the device is substantially watertight, so that it continues to work even if the vehicle has ended up wholly or partly under water. Of course, the optionally arranged moisture sensor should then be arranged outside the watertight housing. Preferably, the device further comprises its own power supply, at least a power source included in the housing, such as an accumulator or battery. The advantage thus achieved is that the device can be arranged at the back in the vehicle without necessitating cabling, while moreover the device is also active if the power supply of the vehicle gets out of order.

Preferably, the device can be switched on from, for instance, a driver's position of the vehicle. In an advantageous embodiment, the device is arranged such that it can be switched off only on or at the housing, for instance by interrupting the power supply. Thus, unintentional switch-off of the device is prevented.

In this description, an acceleration or deceleration circuit is to be understood to include at least a circuit or sensor which on the basis of occurring acceleration and/or deceleration forces can generate or interrupt an electrical current, or can influence the current intensity and/or voltage in an electrical circuit. Moisture sensor or moisture-sensitive circuit should herein be understood to include at least a circuit or sensor which on the basis of moisture can generate or interrupt an electrical current, or can influence the current intensity and/or voltage in an electrical circuit. Lighting element should herein be understood to mean at least a light source such as an incandescent lamp, halogen lamp, LED or like light generating and/or reflecting source. Flashing light device should be understood to mean at least a device that periodically emits light in one or any direction, including rotating lights and the like. Vehicle should herein be understood to mean at least a motor vehicle such as an automobile, truck, passenger bus or van.

To clarify the invention, embodiments of a device according to the invention will be further elucidated with reference to the drawing. In the drawing.

Figure 4:
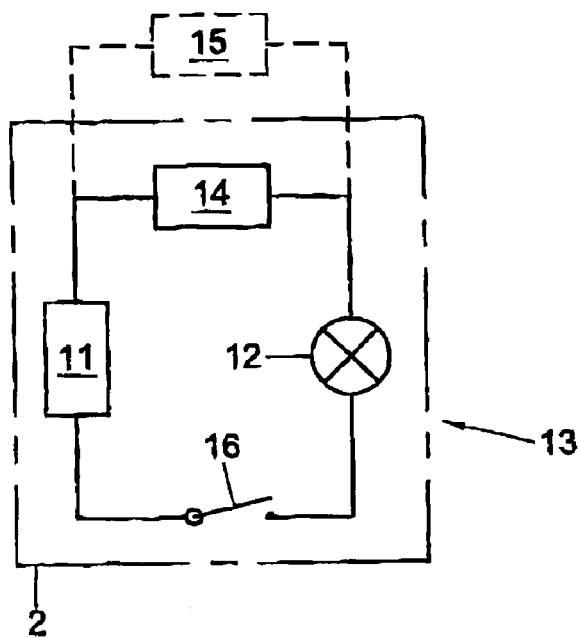
Figure 5:
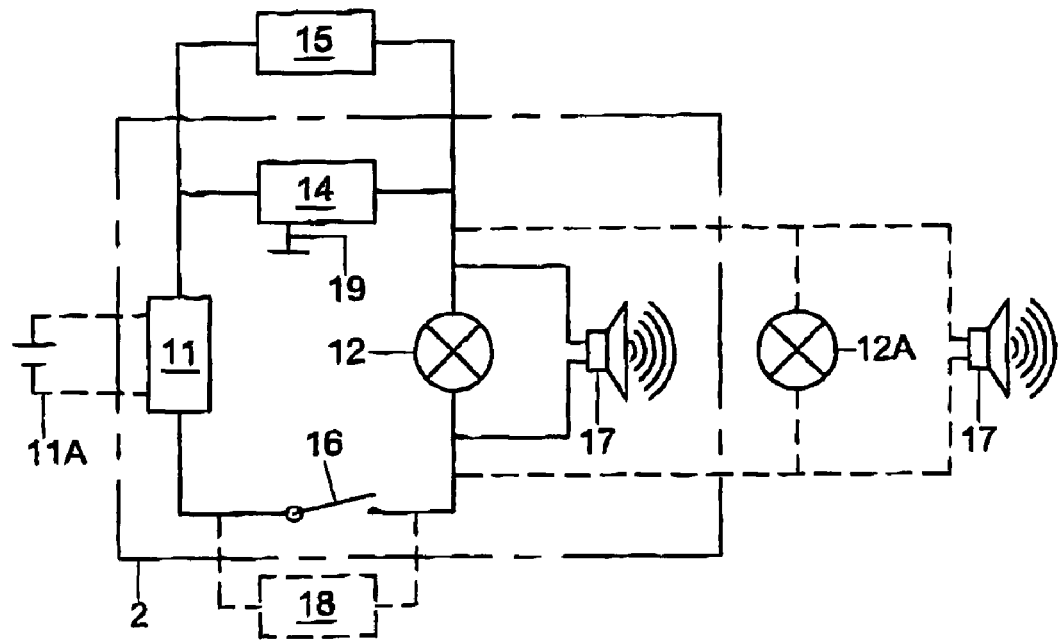

FIG. 4 schematically shows an electrical circuit for a device according to the invention, in a first embodiment; and FIG. 5 schematically shows an electrical circuit for a device according to the invention in a second embodiment.

In this description, the same or corresponding parts have the same or corresponding reference numerals. In this description, embodiments are shown which are provided with an internal power source, in particular an accumulator or battery, as well as an internal light source and/or an internal sound source. It will be clear, however, that instead, or in addition, use can also be made of an external power source, in particular the battery of the respective vehicle, an external light source such as the vehicle lighting and/or an external sound source such as the vehicle horn. In addition, the device can also be used for controlling other vehicle functions, in particular through remote control, such as unlocking of any locked doors, direct or time-delayed opening of windows, doors and/or roof parts, switch-on of an emergency lighting, a telephone connection with an alarm exchange or the like. Here, for instance a time delay can be incorporated for at least a number of these functions, so that the user is offered the possibility of switching off the device before the functions are switched on.

Figure 1:
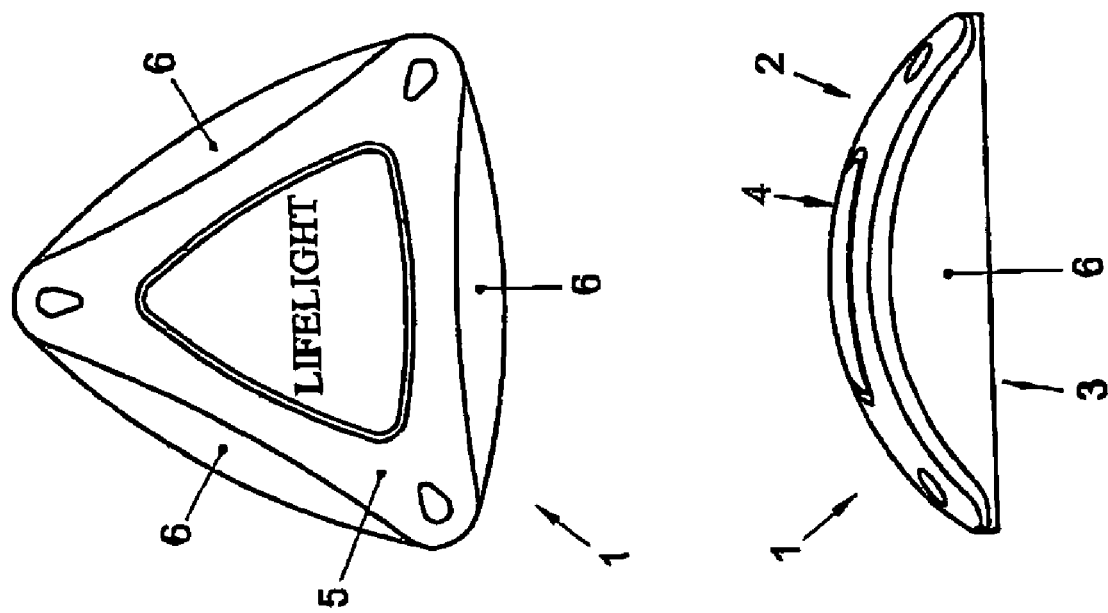
FIG. 1 shows in top plan and side view, and in perspective view, a device according to the invention.
Figure 1:
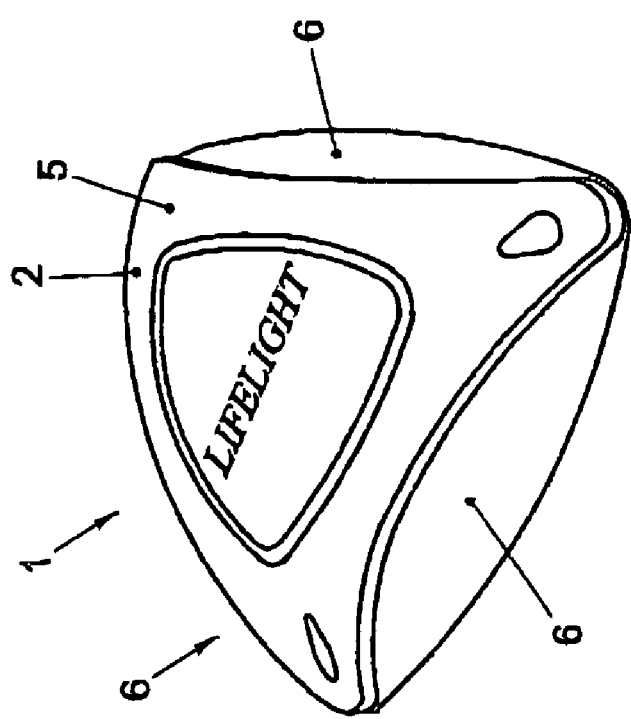
Figure 2:
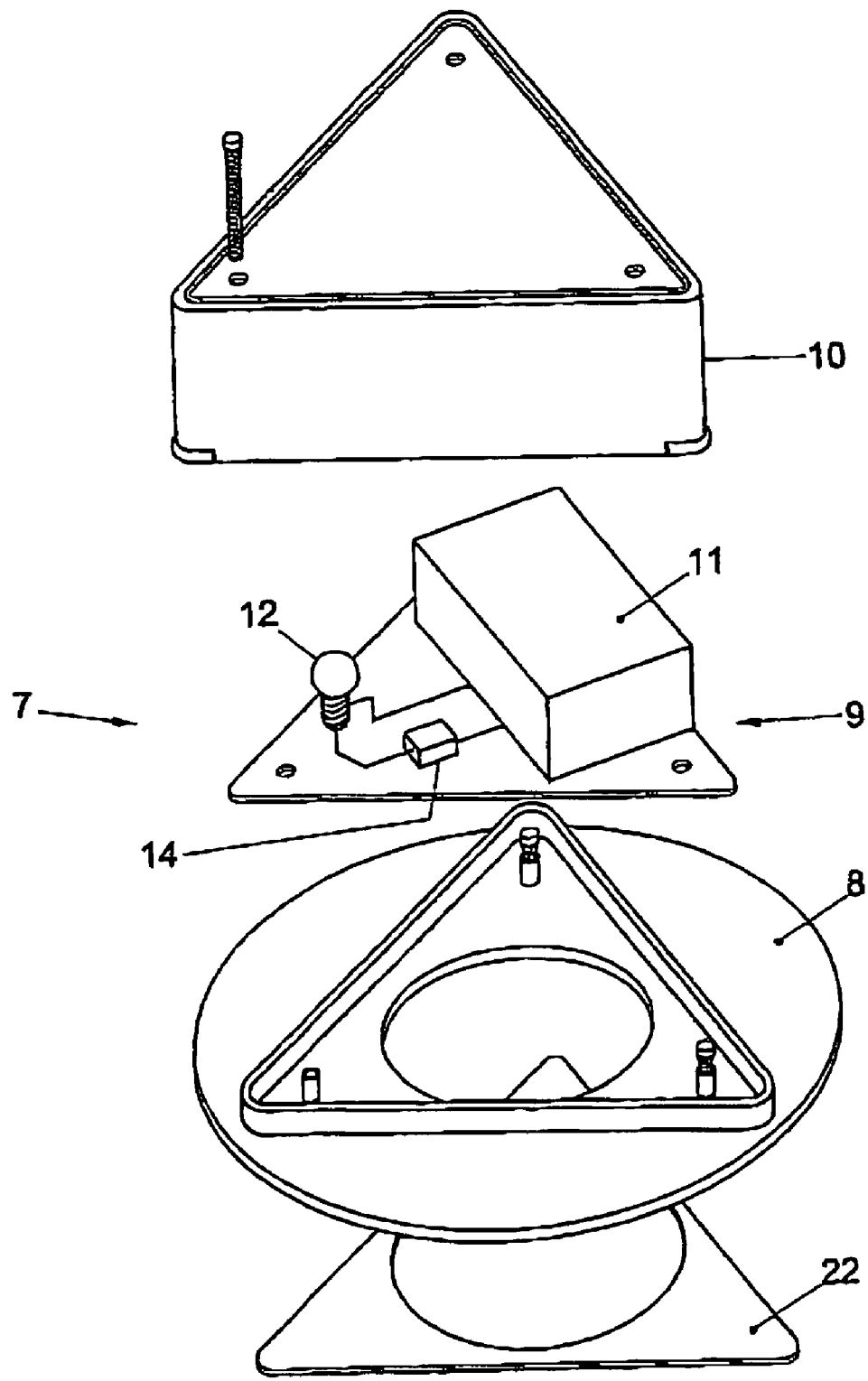
FIG. 2 shows in exploded view a device according to the invention, without outer housing.
Figure 3:
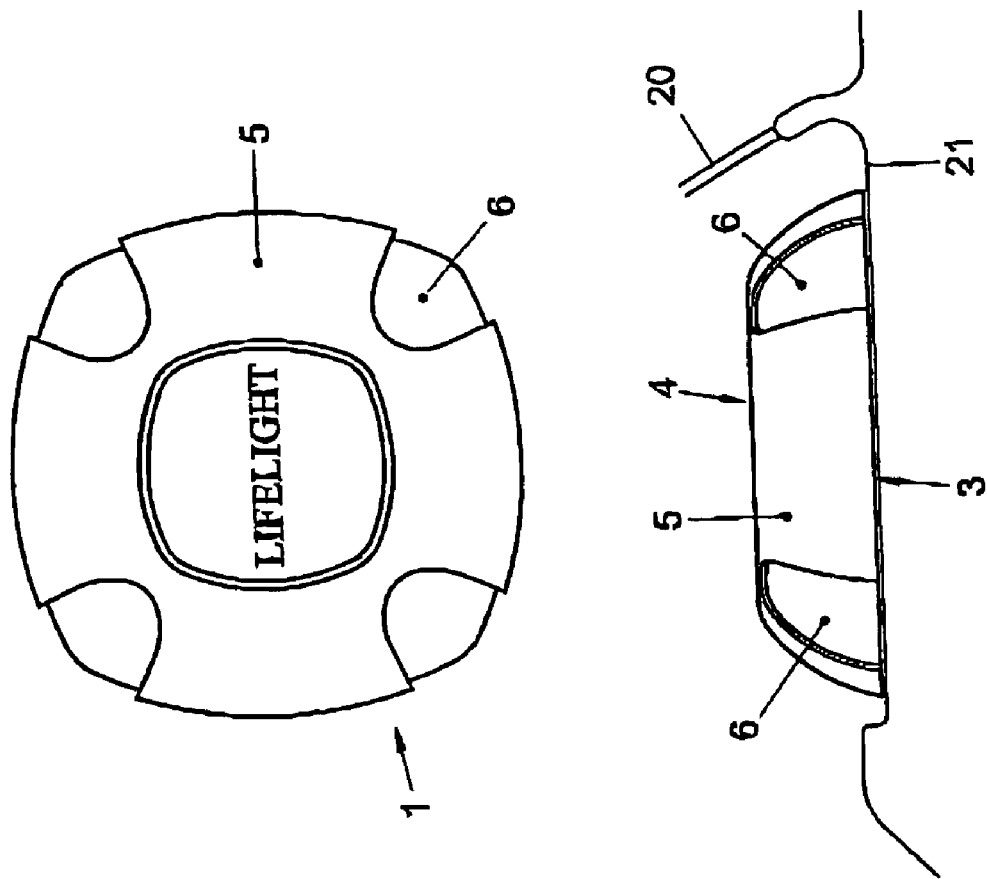
FIG. 3 shows a device according to the invention placed on a parcel shelf in an automobile, in an alternative housing.
Figure 3:
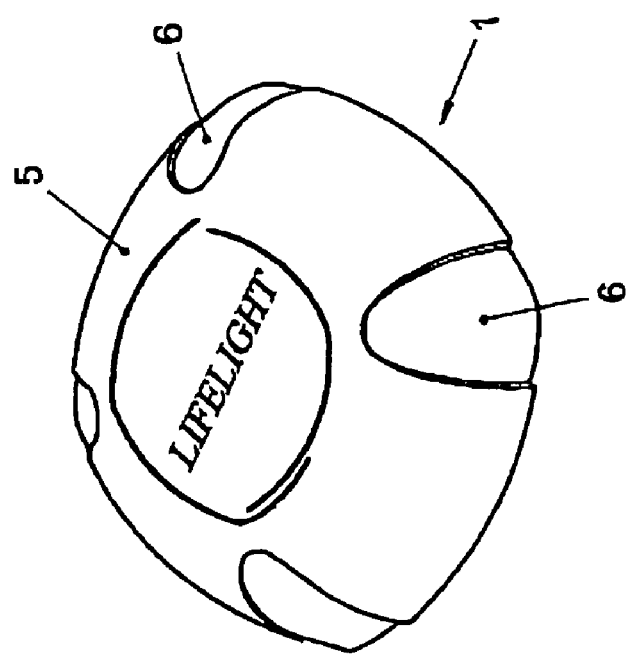

FIG. 1 shows in perspective view as well as in top plan view and side view a device 1 according to the invention. In this embodiment, this device comprises a substantially triangular housing 2 having a substantially flat underside 3 and a convex upper side 4. The upper side is substantially determined by a light-tight cap 5 which is provided, along three sides, with a window 6 through which light can shine. Within the housing 2, as schematically represented in FIG. 2, an inner work 7 is included which will be discussed hereinafter with reference to FIGS. 2, 4 and 5 in particular. The device 1 can be simply disposed loosely on a parcel shelf 21 or the like of a vehicle, preferably such that at least one of the windows 6 is visible through at least one window 20 of the vehicle (FIG. 3). Of course, such a device can also be disposed on the outside of a vehicle, for instance on or in a loading platform or a luggage carrier of a motorcycle. Optionally, means 22 may be provided for securing the device, for instance Velcro®, antislip material, pins or screws or the like. Also, the device may be attached against a pane of a vehicle, for instance with the aid of one or more suction cups, adhesives, clamping means or like means.

As appears from FIG. 2, a device 1, at least an inner work 7, according to the invention may be provided with a bottom plate 8, a printed circuit board 9 and an inner case 10. In this embodiment, the inner case is manufactured wholly or partly from translucent plastic. On the printed circuit board 9, an electrical circuit is included, for instance as shown in FIG. 4, comprising at least the earlier-mentioned power source 11, in particular an accumulator or battery, and a lighting element 12, being, in the embodiment shown, a particularly glaring lamp such as a flash light. This lighting element 12 is for instance a flashing light with a glaring white, orange or blue light, having a particular flashing frequency and glare, preferably to be chosen freely. The inner case 10 is watertightly screwed onto the bottom plate 8, thereby enclosing the printed circuit board 9.

In the wiring diagram 13 shown as a block diagram in FIG. 4, the power source 11 is connected with the lighting element via, on the one hand, an acceleration sensor 14, at least an acceleration and/or deceleration circuit, and on the other hand via a switch 16. Optionally, in parallel with, or instead of the acceleration sensor 14, a moisture sensor 15 may be provided. Such a moisture sensor will extend outside the housing 2, at least outside the inner case 10. The housing 2, at least the inner case 10, represented in chain-dotted lines in FIGS. 4 and 5, is preferably watertight, such that the or each lighting element continues to function in the housing 2 under water as well. By placing the moisture sensor 15 outside the watertight part of the housing 2 or inner case 10, the lighting element can be switched on by both the acceleration sensor 14 and the moisture sensor 15.

The acceleration sensor 14 will usually have a detection direction which is preferably visible on the outside of the housing, for instance indicated by means of an arrow, as schematically shown in FIG. 4. In this embodiment, the housing 2 is substantially square, with the angles designed as windows 6. The detection direction should preferably be placed in line with the normal driving direction of the vehicle. Optionally, a plurality of acceleration sensors 14 may be used, for detecting accelerations in different directions, for instance to be able to detect roll of a vehicle as well. Also, instead, an acceleration sensor 14 may be used that is suitable for measuring accelerations in different directions. A device 1 with a circuit 13 according to FIG. 4 can be simply placed as a loose unit, without necessitating electrical connections with the vehicle.

FIG. 5 shows, as a block diagram, electrical circuit 13 which includes, in addition to the components shown in FIG. 4, a sound source 17 in the form of, for instance, a loudspeaker, horn or the like, preferably in parallel with the lighting element 12. Additionally represented, in broken lines, are an external power source 11A, an external light source 12A and an external sound source 17A. Further shown is an external switch 18 which may be connected with the device 1 via wiring or wirelessly. This switch 18 can be used for remote actuation of the device 1, but may also be arranged for operating the earlier-mentioned functions of the vehicle, such as door locks, windows, sliding roof or the like. Thus, safety can be enhanced still further. In the switch 18, a delay may be incorporated which affords a user the possibility of deactivating the device, at least a few functions thereof. If the external parts are driven by means of a wireless connection, this device 1 too can be disposed as a loose item, at least without external wiring, apart from, possibly, the power source 11A.

In the embodiment shown in FIG. 5, a setting possibility 19 for the acceleration sensor(s) is indicated, through which a limit value can be set for the acceleration or deceleration forces, at least accelerations and/or decelerations that are deemed permissible without the device being switched on, at least without the or each lighting element and/or the or each sound source being switched on. Thus, the sensitivity can be set. Also, however, as shown in FIG. 4, this sensitivity can be set in the factory.

The invention is not limited in any way to the exemplary embodiments shown in the description and the drawing. Many variations thereon are possible within the scope of the invention outlined by the claims.

Thus, for switching on the device, an external acceleration sensor 14 may be used, for instance of an air bag. Also, other forms of housing may be used and the device can be placed in or on a vehicle in a different manner. The device can be so designed that it is switched on at start-up of the vehicle or, for instance, depending on the vehicle speed. It may also be switched on permanently or, in the absence of accelerations, be switched off upon a lapse of time and be switched on again by acceleration sensor(s) if accelerations are being measured. Also, for instance, the light intensity and/or flashing frequency can be determined by the measured acceleration or deceleration, so that the extent of any change in speed of the vehicle can be visualized to following traffic. In that case, it may be chosen for the lighting element, upon decelerations below the set limit value, to be switched on as a "third brake light", preferably with a deceleration-dependent light intensity and, upon decelerations above the set limit value, to be switched on permanently as an alarm light, at preferably maximum intensity, possibly as a flashing or rotating light.

These and many comparable variations are understood to fall within the scope of the invention outlined by the claims.

The invention claimed is:

1. A device for placement in a vehicle, comprising a single housing which includes all of the following components:
   a power source, at least one lighting element, an acceleration and/or deceleration circuit and a moisture sensor, the device being arranged for operatively switching on the at least one lighting element when at least one of either the acceleration and/or deceleration circuit experiences an acceleration or deceleration which exceeds a pre-set maximum value or the moisture sensor comes at least partly under water, wherein the acceleration or deceleration circuit is automatically operative and responsive without operator control or intervention, and wherein the lighting element remains permanently lit after being operatively switched on, wherein all of the components, except the moisture sensor, are provided in a watertight compartment of the housing.

2. The device according to claim 1, wherein the at least one lighting element is arranged for emitting light in at least two directions.

3. The device according to claim 1, wherein the at least one lighting element is arranged as a flashing light device.

4. The device according to claim 1, wherein furthermore a moisture-controlled circuit is provided for switching on the at least one lighting element.

5. The device according to claim 1, wherein means are provided for locating the device on a shelf at the back in the vehicle, such that, with the device switched on, the at least one lighting element is visible from the outside of the vehicle.

6. The device according to claim 5, wherein said vehicle is an automobile.

7. The device according to claim 1, wherein a switching device is provided for switching on the device.

8. The device according to claim 7, wherein said switching device is provided remotely from the device.

9. The device according to claim 1, wherein furthermore a sound source is provided, adapted to be switched on the basis of the acceleration and/or deceleration circuit and/or a moisture-controlled circuit.

10. The device according to claim 9, wherein said sound source is included watertightly within the housing.

11. The device according to claim 1, wherein, as at least one lighting element, a vehicle lighting element is used, and/or, as a sound source, at least a vehicle horn is used, and/or, as a switching device for switching on the device, a vehicle contact is used.

12. The device according to claim 1, wherein the acceleration and/or deceleration circuit experiences said acceleration or deceleration.

13. A device for placement in a vehicle, comprising a single housing which includes all of the following components:

a power source, at least one lighting element, an acceleration and/or deceleration circuit and/or a moisture sensor, the device being placed in the vehicle and being arranged for operatively switching on the at least one lighting element when the device experiences an acceleration or deceleration which exceeds a pre-set maximum value and/or if the device comes at least partly under water, wherein the lighting element and the acceleration and/or deceleration circuit are protected watertightly within the housing, wherein the acceleration or deceleration circuit is automatically operative and responsive without operator control or intervention, and wherein the at least one lighting element remains permanently lit after being operatively switched on, wherein all of the components, except the moisture sensor, are provided in a watertight compartment of the housing.

14. The device according to claim 13, wherein the acceleration and/or deceleration circuit experiences said acceleration or deceleration.

15. The device according to claim 14, wherein a switching device is provided for switching on the device.

16. The device according to claim 15, wherein said switching device is provided remotely from the device.

17. The device according to claim 13, wherein the at least one lighting element is arranged for emitting light in at least two directions.

18. The device according to claim 13, wherein the at least one lighting element is arranged as a flashing light device.

19. The device according to claim 13, wherein furthermore a moisture-controlled circuit is provided for switching on the or each lighting element.

20. The device according to claim 13, wherein within the housing a power source is provided.

21. The device according to claim 20, wherein said power source included watertightly within the housing.

22. The device according to claim 13, wherein means are provided for placing the device at the back in the vehicle, such that, with the device switched on, the or each lighting element is visible from the outside of the vehicle.

23. The device according to claim 13, wherein said vehicle is an automobile.

24. The device according to claim 13, wherein furthermore a sound source is provided, adapted to be switched on the basis of the acceleration and/or deceleration circuit and/or a moisture-controlled circuit.

25. The device according to claim 24, wherein said sound source included watertightly in the housing.

26. The device according to claim 13, wherein, as at least one lighting element, a vehicle lighting element is used, and/or, as a sound source, at least a vehicle horn is used, and/or, as a switching device for switching on the device, a vehicle contact is used.

27. A vehicle comprising an alarm device, the device comprising:

a water tight housing comprising at least one light transparent part, and enclosing within the housing:

a power source;

at least one lighting element;

an acceleration and/or deceleration circuit;

a moisture sensor having at least one moisture sensing part extending outside the housing; and a control circuit coupled to the at least one lighting element, the acceleration and/or deceleration circuit and the moisture sensor;

the control circuit comprising:

a comparator for comparing a measured acceleration and/or deceleration of the vehicle and device with a pre-set maximum value;

the control circuit being arranged for switching on the at least one lighting element if the measured acceleration and/or deceleration of the vehicle and device exceeds the pre-set maximum value and/or when moisture is sensed by the moisture sensor;

wherein the device is positioned in the vehicle such that the light from the at least one lighting element can be seen from outside the vehicle, shining through the at least one transparent part of the housing, wherein the acceleration or deceleration circuit is automatically operative and responsive without operator control or intervention, and wherein the at least one lighting element remains permanently lit after being operatively switched on.

* * * * *